US009210169B2

(12) United States Patent
Wong (10) Patent No.: US 9,210,169 B2
(45) Date of Patent: Dec. 8, 2015

(54) NETWORK SESSION MANAGEMENT BASED ON CONTEXTUAL INFORMATION (71) Applicant: Cisco Technology, Inc., San Jose, CA (US)

(72) Inventor: Pok Sze Wong, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 267 days.

(21) Appl. No.: 13/721,326

(22) Filed: Dec. 20, 2012

(65) Prior Publication Data

US 2014/0181290 A1 Jun. 26, 2014

(51) Int. Cl.
G06F 15/173 (2006.01)
H04L 29/06 (2006.01)
G06F 21/10 (2013.01)
G06F 21/62 (2013.01)
G06F 21/31 (2013.01)

(52) U.S. Cl.
CPC .............. H04L 63/10 (2013.01); G06F 21/10 (2013.01); G06F 21/31 (2013.01); G06F 21/62 (2013.01); G06F 21/6218 (2013.01); H04L 63/20 (2013.01); H04L 63/102 (2013.01); H04L 63/107 (2013.01); H04L 63/108 (2013.01)

(58) Field of Classification Search
USPC .............. 709/224, 223, 225; 726/1, 28, 4
See application file for complete search history.

(56) References Cited

U.S. PATENT DOCUMENTS

| 6,502,192 | B1 | 12/2002 | Nguyen |
|---|---|---|---|
| 7,028,073 | B1 | 4/2006 | Bui et al. |
| 7,792,975 | B1 | 9/2010 | Dashora et al. |
| 2013/0031598 | A1* | 1/2013 | Whelan et al. .................. 726/1 |
| 2014/0143837 | A1* | 5/2014 | Fletcher et al. ................ 726/4 |

OTHER PUBLICATIONS

Cisco Systems, Inc., "Cisco Identity Services Engine," At-A-Glance, retrieved from http://www.cisco.com/en/US/prod/collateral/vpndevc/ps5712/ps11637/ps11195/at_a_glance_c45-654884.pdf, on Dec. 20, 2012, 3 pages.
Cisco Systems, Inc., "Cisco TrustSec Security Group Access Solution Configuration Guide," Version 1.5, Cisco TrustSec Configuration Guide, pp. 1-106, 2010.

* cited by examiner

Primary Examiner — Kyung H Shin
(74) Attorney, Agent, or Firm — Edell, Shapiro & Finnan, LLC (57) ABSTRACT An access control module in an enterprise computing network receives contextual information of a first active network session at a first network endpoint and contextual information of a second active network session at a second network endpoint. The access control module is configured to evaluate the contextual information of one or more of the first or second network sessions based on one or more network policies to determine a policy action for enforcement on at least one of the first or second network endpoints.

28 Claims, 5 Drawing Sheets

NETWORK SESSION MANAGEMENT BASED ON CONTEXTUAL INFORMATION

TECHNICAL FIELD

The present disclosure relates to managing network sessions of a user.

BACKGROUND

Enterprise computing networks are networks built by enterprises (e.g., businesses, universities, etc.) that enable users to share computing resources. Traditionally, users within the enterprise premises (e.g., buildings, offices, production sites, etc.) access the enterprise computing network via network endpoints/terminals (e.g., desktop computers or laptop computers) that are connected to the network through a physical network connection. Often, the enterprise computing networks are configured to interconnect multiple premises so that the users at different locations can share the computer resources. Network access via network endpoints within an enterprise's premises is sometime referred to herein as local network access.

Many enterprise computing networks are now configured to allow users to remotely access the network. During remote network access, the users access the network through network endpoints that are located at remote sites (i.e., outside the enterprise premises) or through network devices that are physically disconnected from the enterprise network. Remote sites may include, for example, a user's home or a public location that has Internet connectivity. A network endpoint that is physically disconnected from the enterprise network may include, for example, a computer or a mobile device (e.g., tablet computer, mobile phone, personal digital assistant (PDA), etc.) that is configured to connect to the network through a wireless connection. Network endpoints that are physically disconnected from the enterprise network may be used at remote locations or, at times, within the enterprise's physical premises.

DESCRIPTION OF EXAMPLE EMBODIMENTS

Overview

An access control module in an enterprise computing network receives contextual information of a first active network session at a first network endpoint and contextual information of a second active network session at a second network endpoint. The access control module is configured to evaluate the contextual information of one or more of the first or second network sessions based on one or more network policies to determine a policy action for enforcement on at least one of the first or second network endpoints.

Example Embodiments

It is common for a user of an enterprise computing network to establish an active network session at a first network endpoint, such as a computer, and then to subsequently leave the endpoint unattended for a period of time. It is also common for users to have one or more mobile devices that are "always on" or are "default connected" network endpoints. That is, the mobile devices are authenticated and connect to the enterprise computing network automatically when, for example, the users are in the office, the device is powered on, or when a network connection is available through a local area network (LAN), wide area network (WAN), etc. As such, although a user will generally only use one network session at a time, a user may be simultaneously associated with multiple active network sessions at different network endpoints, thereby increasing the likelihood that an endpoint will be left unattended.

Traditionally, when a user leaves unattended a network endpoint supporting an active network, both the user and network administrators rely on the operating system (OS) of the endpoint to protect access to the network. That is, conventional arrangements secure access to the active network session through mechanisms such as browser timeout, browser logout, OS screen saver lock, user-executed screen lock, etc.

Often, these conventional mechanisms are not consistently enforced across the network or may provide a significant window of opportunity during which access to the network session and the network resources may be compromised. This may be problematic in situations where there is a need to block access to, for example, healthcare, finance and other sensitive network resources, such as cloud applications and/or data, when the user is no longer at the network endpoint.

Techniques are presented herein to use contextual information/data of concurrent network sessions to secure the network sessions in a consistent manner across an enterprise computing network. More particularly, different network endpoints that each support active network sessions are used as probes to relay contextual information to a central policy control and session tracking system, referred to herein as an access control device or module. The access control module evaluates the contextual information in view of one or more network security policies and determines a network security policy action for enforcement on one of the network endpoints.

Figure 1:
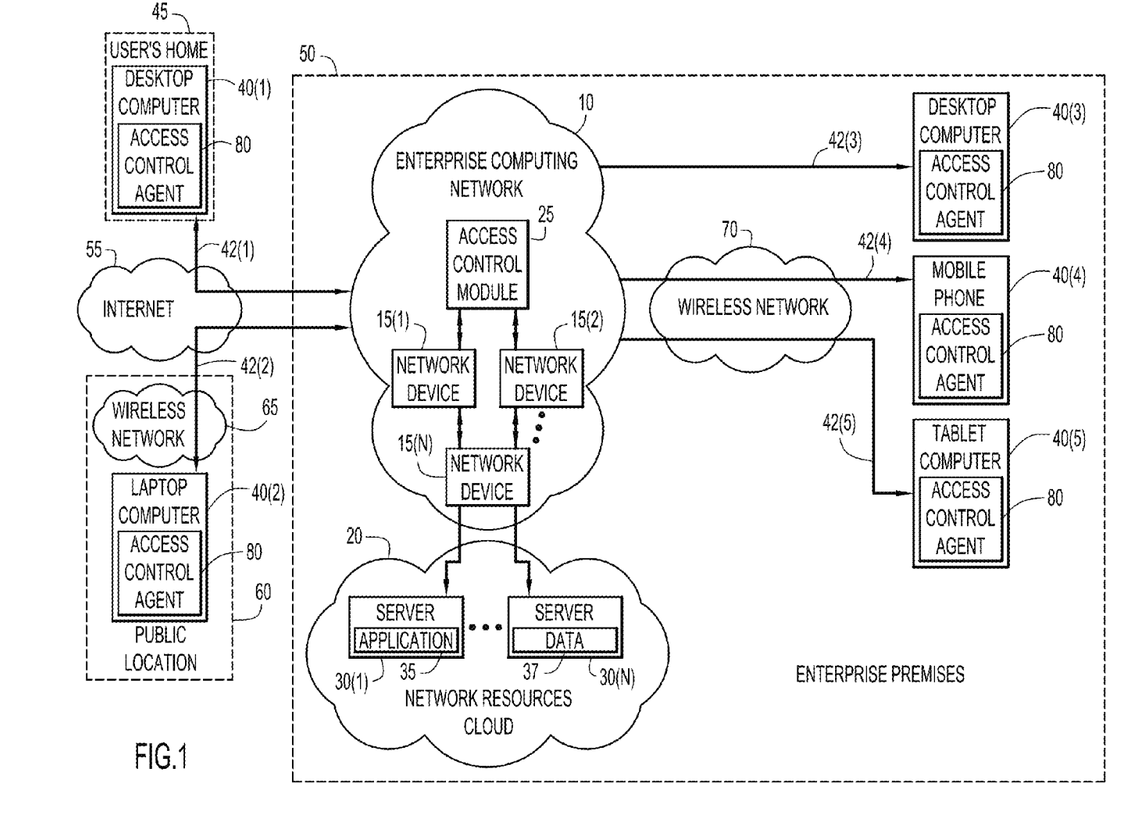
FIG. 1 is a block diagram of an enterprise computing network in which access control techniques are provided based on contextual information.

FIG. 1 is a block diagram of an enterprise computing network 10 in accordance with examples presented herein. Enterprise computing network 10 may be, for example, a local area network (LAN) or a wide area network (WAN) and comprises a plurality of network devices 15(1)-15(N), a network resources cloud 20, and an access control module 25. Network devices 15(1)-15(N) may comprise, for example, switches, routers, firewalls, etc. Network resources cloud 20 comprises a plurality of servers 30(1)-30(N) that each host one or more backend network resources. The network resources may comprise, for example, enterprise applications 35 and/or data storage 37. The applications 35 and/or data storage 37 are network resources that may be accessed by users from one or more network endpoints 40(1)-40(5). Servers 30(1)-30(N) of network resources cloud 20 may be physical servers and/or virtual machines that are hosted within the physical premises of the enterprise or hosted by a third-party at a remote location.

Enterprise computing network 10 is configured to allow local and remote network access to the network. That is, a user may establish a network session from local network endpoints (i.e., endpoints within the enterprise premises that are physically connected to the network) or from remote endpoints (i.e., endpoints that are located at remote sites or endpoints within the enterprise premises that are physically disconnected from the enterprise network). As used herein, a network session comprises a connection of a network endpoint to the enterprise computing network 10 that enables access to the network resources, such as applications 35 and/or data storage 37. FIG. 1 illustrates an example arrangement where five different endpoints 40(1)-40(5) are all used by a single user to establish network sessions for access to enterprise computing network 10.

In the example of FIG. 1, the first network endpoint 40(1) is a desktop computer that is located at the user's home 45. The desktop computer 40(1) is a remote endpoint (i.e., it is located outside of the enterprise's premises 50) and is configured to establish a network session 42(1) with the computing network 10 through, for example, the Internet 55. The second network endpoint 40(2) is a laptop computer that is used to access the enterprise computing network 10 from a public location 60. The laptop computer 40(2) is a remote endpoint comprising at least one wireless interface (e.g., Wi-Fi interface, a 3rd generation (3G) mobile telecommunications interface, Bluetooth interface, etc.) that enables the laptop computer to establish a network session 42(2) via, for example, a public wireless network 65 and the Internet 55.

The third network endpoint 40(3) is a desktop computer that is located within the enterprise's premises 50 (e.g., in the enterprise's office building). The desktop computer 40(3) is a local endpoint that is physically connected to the enterprise computing network 10 via, for example, network cables, so that the desktop computer 40(3) can establish a network session 42(3). The fourth network endpoint 40(4) is a mobile phone that is used to access the enterprise computing network 10 from within the enterprise premises 50. The mobile phone 40(4) is a remote endpoint comprising at least one wireless interface that enables the mobile phone to establish a network session 42(4) via, for example, a local wireless network 70 provided within the enterprise premise 50. Similarly, the fifth network endpoint 40(5) is a tablet computer that is used to access the enterprise computing network 10 from within the enterprise premises 50. The tablet computer 40(5) is a remote endpoint comprising at least one wireless interface that enables the tablet computer 40(5) to establish a network session 42(5) via, for example, local wireless network 70 provided within the enterprise premise 50.

As such, FIG. 1 illustrates one example having one local network endpoint (desktop computer 40(3)) and four remote network endpoints (desktop computer 40(1), laptop computer 40(2), mobile phone 40(4), and tablet computer 40(5)). It is to be appreciated that the network arrangement of FIG. 1 is merely one example and that different network arrangements may be used in other examples.

In general, network sessions are specific to a network endpoint. That is, each network endpoint is configured to connect to the enterprise computing network 10 to establish a single session and thereby allow a user to access the network resources (applications 35 and/or data within the data storage 37). However, it is to be appreciated that certain examples may include one or more virtual machines operable at a network endpoint. In such examples, one physical device (e.g., computer) may support two or more network sessions, where one session is directly established through the computer OS while the additional one or more sessions are established through a virtual desktop interface (VDI) application.

In the example of FIG. 1, a user may have different active network sessions 42(1)-42(N) established on the various network endpoints 40(1)-40(5) at the same time or at different times. For example, a user may establish a first network session 42(1) via desktop computer 40(1) before leaving his/her home 45. However, the user may forget to terminate this network session 42(1) before leaving for work so that the session remains active even though the user is no longer at home. Next, the user may stop at a public location 60, such as a coffee shop, to work for some time before heading to the office. When the user starts to work at the public location 60, the user may establish another network session 42(2) via laptop computer 40(2). As such, while at the public location 60, the user may be associated with two different active network sessions, one session established at desktop computer 40(1) and one session established at laptop computer 40(2).

Continuing in the above example, the user may finish working at the public location 60 and head to the enterprise premises (office) 50. The user may terminate the network session 42(2) at laptop computer 40(2) before heading to the office 50. Once at the office 50, the user may log into his/her assigned desktop computer 40(3) and establish another network session 42(3) for access to network resources 35 and/or 37. Similarly, the user may, at the same time or at a different time, establish further network sessions 42(4) and 42(5) via mobile phone 40(4) and tablet computer 40(5), respectively. In certain examples, the mobile phone 40(4) and/or the tablet computer 40(5) may be "always on" or "default connected" network endpoints that automatically establish a network session when, for example, the devices are powered on, or when a network connection is available through a LAN, WAN, etc.

Although a user will generally only use one network session at a time, the user may be simultaneously associated with multiple active network sessions at different network endpoints. As such, is common for users to leave an active network session unattended for a period of time which may allow access to sensitive network resources and/or provide an opportunity for a hacker or other malicious entity to access the network. In the example of FIG. 1, access control module 25 is configured to reduce or substantially eliminate the opportunities for access to sensitive applications and the network in general as a result of the use of concurrent active network sessions. More particularly, access control module 25 is a central policy control infrastructure that gathers real-time contextual information from the network, user, and/or devices to orchestrate/coordinate enforcement of network policies with enterprise computing network 10.

Access control module 25 is configured to monitor contextual information of each of the network sessions via access control agents 80. Since various different types of network endpoints may be used by a user to establish a network session for access to enterprise computing network 10, an initial network access provisioning process may include download of the appropriate version of access control agent 80 that is applicable to the specific network endpoint.

The contextual data detected and monitored by the access control agents 80 may include, in one example, the location of the network endpoint. This location information may be general location information (i.e., indicating that the network endpoint is at a user's home, a public location, or the office) or the location information may indicate a specific location within such general locations (i.e., indicating that the network endpoint is, for example, at the user's assigned workstation, away from the assigned workstation, at a cafeteria within the enterprise premises, etc.). Additionally, the contextual information may indicate physical movements of the network endpoint. As such, access control module 25 may use the location and/or movement information as an indicator of where the user is located or where his/her attention is focused.

Depending on the capabilities of the underlying hardware, global positioning system (GPS) and/or accelerometer data may be collected to indicate location or movement. In lieu of hardware location support, the geographic location can be approximated by the access control module 25 based on the point of network attachment (e.g., the section of the floor with the wireless access point or switch port feed).

The contextual data may also include an indication of user activities on the network endpoint. In one example, the indication of the user's activity includes an indication of the user's interactions with the network endpoint (device interactions). Interaction may include mouse, keyboard, and screen touch events, some of which are determined from hardware device/universal serial bus (USB) port metrics. The indication of the user's activity may also include an indication of the use of certain applications, such as email, chat, etc., by the user. In certain such examples, a network endpoint's associated Netflow data can be used by the access control module 25 to determine the use of an application. That is, various applications, when used on a network endpoint, will emit network traffic flows from which the access control module 25 can determine the usage of that application on the particular network endpoint. As such, access control module 25 may use these interactions or use of applications as an indicator of where (i.e., on which network endpoint device) the user is focused (e.g., using his/her mobile phone and not his/her desktop computer).

In accordance with examples presented herein, the network endpoints are associated with identity information, such as a user name of the user, Media Access Control (MAC) address of the network endpoint, a certificate that uniquely identifies the user or network endpoint device, identification of groups to which the user belongs, network endpoint manufacturer information and/or device type (e.g., desktop, laptop, mobile phone, etc.), entitlement group of the user (e.g., engineering department, payroll department, marketing department, management, etc.), or the like. Any of these pieces of information may be contextual information that is provided to the access control module 25 for evaluation.

In general, the access control module 25 is configured to track all of the sessions of a user to receive the above or other contextual data from access control agents 80 on each of the network endpoints that support (i.e., were used to establish) an active network session. In the example of FIG. 1, once the user enters the office and logs into his/her desktop computer 40(3), there may a total of four active network sessions of the user that are tracked by the access control module 25: session 42(1) supported by desktop computer 40(1), session 42(3) supported by desktop computer 40(3), session 42(4) supported by mobile phone 40(4), and session 42(5) supported by tablet computer 40(5). As such, access control module 25 receives contextual data from the access control agents 80 embedded on each of the four network endpoints 40(1), 40(3), 40(4), and 40(5).

Once the access control module 25 receives the contextual information of one or more of the active sessions, the access control module 25 evaluates the contextual information based on, or in view of, one or more network policies. These network policies may be, for example, predetermined policies set by a network administrator. Based on the evaluation of the contextual information, the access control module 25 is configured to select/determine one or more network policy actions for enforcement on at least one of the first or second network endpoints. The network policy action may be enforced on the various network endpoints by, for example, the access control agents 80 in cooperation with the endpoint OS and/or the endpoint hardware.

A number of different policy actions may be selected for enforcement on a network endpoint. In certain examples, the access control module 25 is configured to enforce (via local hardware/software support on a network device) an adjustment to the access/entitlement of a network endpoint. The entitlement adjustments may include, for example, temporarily terminating access to the entire enterprise computing network 10, temporarily terminating access to network resources cloud 20, temporarily changing the access control list to block access to specific address and port destinations such that applications can no longer reach certain portions of the network from that network endpoint, temporarily changing the firewall network device to block the flow of traffic specific to the sensitive applications on the network endpoint based on their traffic type, ports where the traffic flows, and traffic signature, temporarily have the network device tagging the packet sent by the network endpoint with a different security group tag so that packet conveying sensitive operation requests and data are blocked at the firewall network device gating the server that service the request, etc.

In one example, the access control module 25 is configured to limit the number of active sessions of a user, particularly when there is no activity with one or more sessions. In such embodiments, the access control module 25 may assign a session "limit." When this limit is exceeded, the access control module 25 is configured to terminate at least one active session. The selection of which active session to terminate may occur in a number of different ways. For example, the access control module 25 may select the active session to terminate by evaluating the user's activity in the various active sessions. In one such example, the access control module 25 could terminate the session having the longest period without any user interactions. Alternatively, in another example the access control module 25 could terminate the session by evaluating the location of the various network endpoints associated with the sessions and terminating a session that is not at the same location as the user, terminating a session that is in the least secure location, etc.

In the example of FIG. 1, the access control agent 80, or another agent running on a network endpoint, is configured to support authentications on the end user side (e.g., prompts for username/password as applicable) to login the user on to the network. Additionally, the enterprise computing network 10 is configured to ensure that the users and/or endpoints connecting to the network are authenticated (e.g., via IEEE 802.1x) and authorized with the appropriate access to resources on the network 10 and network resources cloud 20. As noted, a user may be associated with multiple devices and each of the devices will be authenticated on a per-session basis, and will be centrally visible and managed by access control module 25. That is, because all of the network endpoints are authenticated to the network, the access control module 25 is aware of the user that is associated with each network endpoint.

The network authorizations may include security tags (e.g., Security Group Tags (SGTs) and access control lists (ACL) that dictate the network addresses, ports and traffic types originating from a user on a network endpoint may be permitted or denied access to, at a packet flow granularity. For example, a network device gating the network flow to a sensitive application in the cloud may be configured with security policies that allow only packets with a specific security tag, while denying all others.

The techniques presented herein provide a new policy capability where a network administrator may establish policies that are enforced in a first network session based on information received in second network session. That is, according to the techniques presented herein, the context of one session may be monitored (e.g., mobile phone on the move) and used to take action in another session, allowing a holistic approach to enforce network policies consistently across a computing network.

Figure 2:
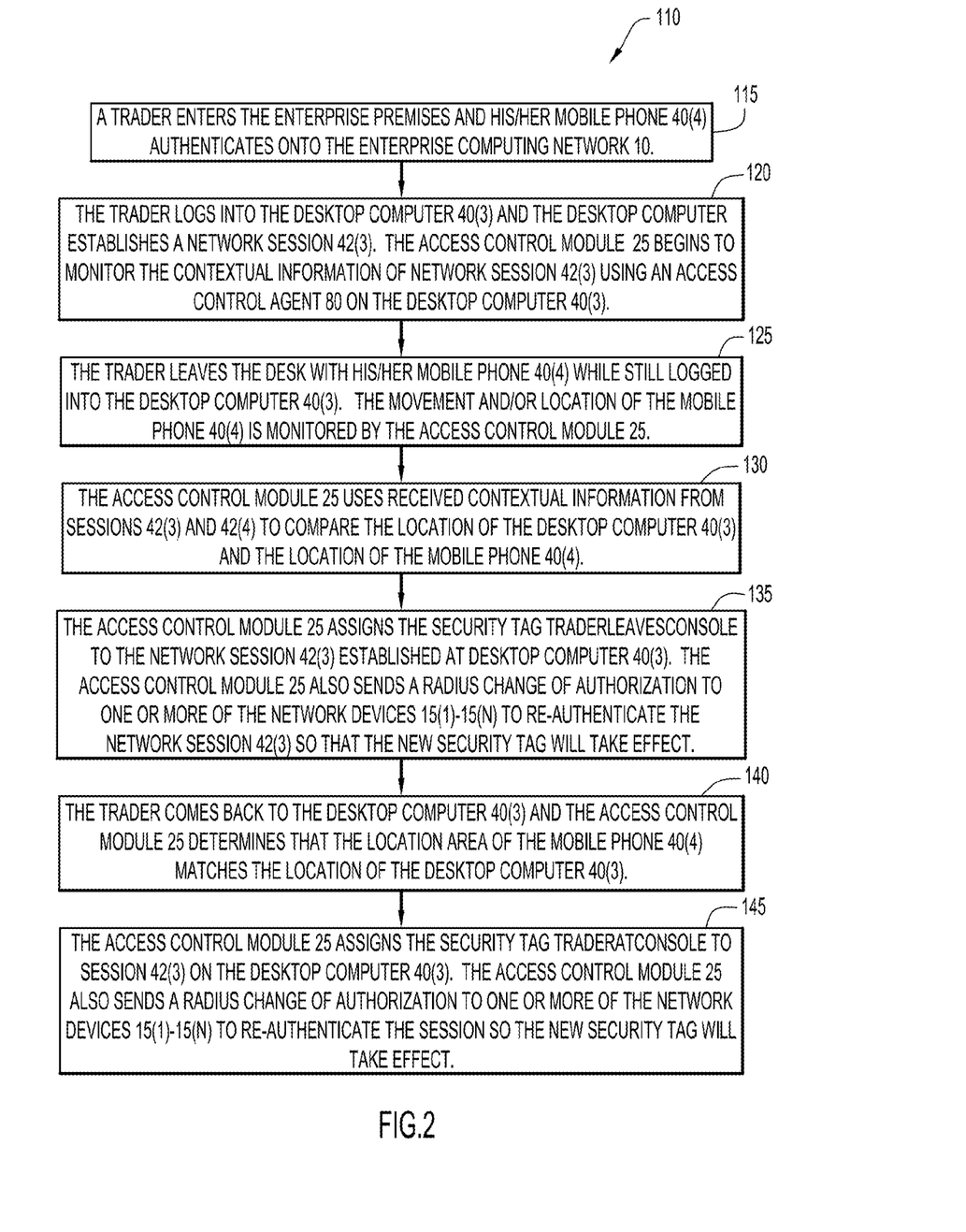
FIG. 2 is a detailed flowchart illustrating use of access control techniques in accordance with examples presented herein.

In accordance with examples presented herein, a network administrator can design and implement various network policies for enforcement across multiple user devices and network sessions. FIG. 2 is a flowchart of a method 110 for the design and implementation of one example network policy, namely a secure stock trading. For ease of illustration, the method of FIG. 2 will be described with reference to the arrangement of FIG. 1.

Method 110 begins at 115 where a user (i.e., a trader) enters the enterprise premises (office) and his/her mobile phone 40(4) authenticates to the enterprise computing network 10. In other words, the mobile phone 40(4) establishes a network session 42(4). At this point, the access control module 25 begins to monitor the contextual information of network session 42(4) using an access control agent 80 on the mobile phone 40(4).

Next, at 120, the trader sits down at his/her desk and logs into the desktop computer 40(3) and the desktop computer establishes a network session 42(3). The access control module 25 begins to monitor the contextual information of network session 42(3) using an access control agent 80 on the desktop computer 40(3). For example, the location of the desktop computer 40(3) and the mobile phone 40(4) are monitored through the point of network connection or with the help of the agents 80 running on the devices, using, for example, GPS hardware.

The desktop computer 40(3) may be authenticated with a MAC address database, and the trader is authenticated with a user directory service, such as the Active Directory. Also at 120, the desktop computer 40(3) may be profiled as a trading console by profiling its hardware through gleaning of Dynamic Host Configuration Protocol (DHCP) traffic, Link Layer Discovery Protocol (LLDP) traffic, Hypertext Transfer Protocol (HTTP) traffic, and/or Network mapper (NMAP) scans. At this point, the trader may, for example, launch a one or more low security applications, browses to a one or more low security portals, and runs a stock trading application that either utilizes network resources or is served from a trading application 35 in the network resources cloud 20. A security tag of "TraderAtConsole" is assigned to the network traffic originating from the trader's desktop computer 40(3) (i.e., the trader's trading workstation).

In this example, a "stock trading" policy is defined such that full trading access is available for traffic flow with the security tag TraderAtConsole bound for a trading application 35 ("StockTradingApp") in the network resources cloud 20. This policy further includes a second security tag of "TraderLeavesConsole". The security policy is set such that any packets with the security tag "TraderLeavesConsole" that are bound for the "StockTradingApp" will be denied. The above tasks can be accomplished through the access control module 25. Additionally, a network configuration is set such that the user is authenticated against the user directory service to determine whether he/she is on the desktop computer 40(3) (i.e., the authorized trading console) or on another device, such as mobile phone 40(4). When multiple sessions are active, both sessions are tracked by the access control module 25 that can, using contextual information, determine that one device is a desktop computer and another device is a mobile device, along with other information such as the device locations.

The stock trading policy is also defined such that if the mobile phone 40(4) and desktop computer 40(3) of the user are at different locations, the security tag of any traffic sent to the StockTradingApp will be set to TraderLeavesConsole. If the mobile phone 40(4) and the desktop computer 40(3) are at the same location, then the security tag of any traffic sent to the StockTradingApp will be set to TraderAtConsole. In other words, the network policy is set such that if received contextual data indicates that the mobile phone 40(4) and desktop computer 40(3) of the user are at different locations, the access control module 25 will recognize that, at that time, any traffic sent to the StockTradingApp will be originating from the mobile phone 40(4) and not the desktop computer 40(3). Conversely, if the received contextual data indicates that the mobile phone 40(4) and desktop computer 40(3) of the user are at the same locations, then the access control module 25 can infer that any traffic sent to the StockTradingApp will be originating from the authorized desktop computer 40(3).

In these examples, the access control module 25 is configured to support the definition of a policy in which an endpoint evaluation process occurs when the location of the mobile phone 40(4) changes. The access control module 25 will also be enhanced to perform, for example, a Remote Authentication Dial-In User Service (RADIUS) Change of Authorization so that the network session on the desktop computer 40(3) is associated with the proper security tag.

At 125, the trader leaves the desk with his/her mobile phone 40(4) while still logged into the desktop computer 40(3). The movement and/or location of the mobile phone 40(4) is monitored by the access control module 25 through a point of network connection roaming determination, or with the help of the agent 80 running on the mobile phone 40(4) (i.e., using GPS hardware) as the move occurs. The access control module 40 receives an update of the new location from the network infrastructure (e.g. via a RADIUS accounting update) or from the agent 80 on the mobile phone 40(4) using an Application Programming Interface (API).

At 130, the access control module 25 uses received contextual information from sessions 42(3) and 42(4) to compare the location of the desktop computer 40(3) and the location of the mobile phone 40(4). Because the trader has left his/her workstation, the access control module 25 determines that the locations of the two devices are different. As such, at 135, the access control module 25 assigns the security tag TraderLeavesConsole to the network session 42(3) established at desktop computer 40(3). The access control module 25 also sends a RADIUS change of authentication to one or more of the network devices 15(1)-15(N) to re-authenticate the network session 42(3) so that the new security tag will take effect. This re-authentication occurs on the network device infrastructure and is transparent to the end user who will not experience any impact other than that intended by the change of the security tag. There are no connectivity changes on the desktop computer 40(3). However, with the TraderLeavesConsole security tag, access to the trading application 35 on the applications cloud 20 will be denied according to the content of the security policy. Other applications on the desktop computer 40(3) and the login session, which are not blocked by the particular security policy, will not be affected.

The policy action of blocking access to the trading application 35, which is triggered by the trader moving to a different location, is expected to take effect more promptly and accurately than the traditional technique of relying on screen timeout locks. The operations presented herein are also more precise in scope than the traditional way of using login session timeout, which terminates the entire session, rather than blocking access to specific sensitive applications. In certain examples, at the option of the administrator, it is also possible to close out the session on the desktop computer 40(3) if so desired, with an authorization that disconnects the port rather than modifying the security tag.

At 140, the trader comes back to the desktop computer 40(3) and the access control module 25 determines that the location area of the mobile phone 40(4) matches the location of the desktop computer 40(3). As such, at 145, the access control module 25 assigns the security tag TraderAtConsole to session 42(3) on the desktop computer 40(3). The access control module 25 also sends a RADIUS change of authorization to one or more of the network devices 15(1)-15(N) to re-authenticate the session so the new security tag will take effect. As noted above, this re-authentication occurs on the network device infrastructure and is transparent to the end user and there are no connectivity changes on the desktop computer 40(3) except that access to the trading application 35 will again be allowed.

In variations of this stock trading policy example, different contextual data may be used to determine when the trader is no longer at desktop computer 40(3). For example, rather than using the location of the mobile phone 40(4), an administrator may configure an endpoint evaluation to occur when the trader emails/chats on the mobile phone 40(4). More specifically, various applications, when used on a network endpoint, will generate/emit network traffic flows from which the access control module 25 can determine the usage of that application on the particular network endpoint. As such, access control module 25 may use these applications as an indicator of where the trader is focused (e.g., using his/her mobile phone and not his/her desktop computer) and accordingly change the security tag associated with session 42(3) to block/allow access to trading application 35 or to enforce other policy actions.

In summary, multiple network sessions are established and the context of one network session is correlated with another network session for enforcement of a policy action in that session. In other words, the techniques presented herein use the contextual information of related network sessions at different network endpoints associated with the same user to enforce network policies.

Figure 3:
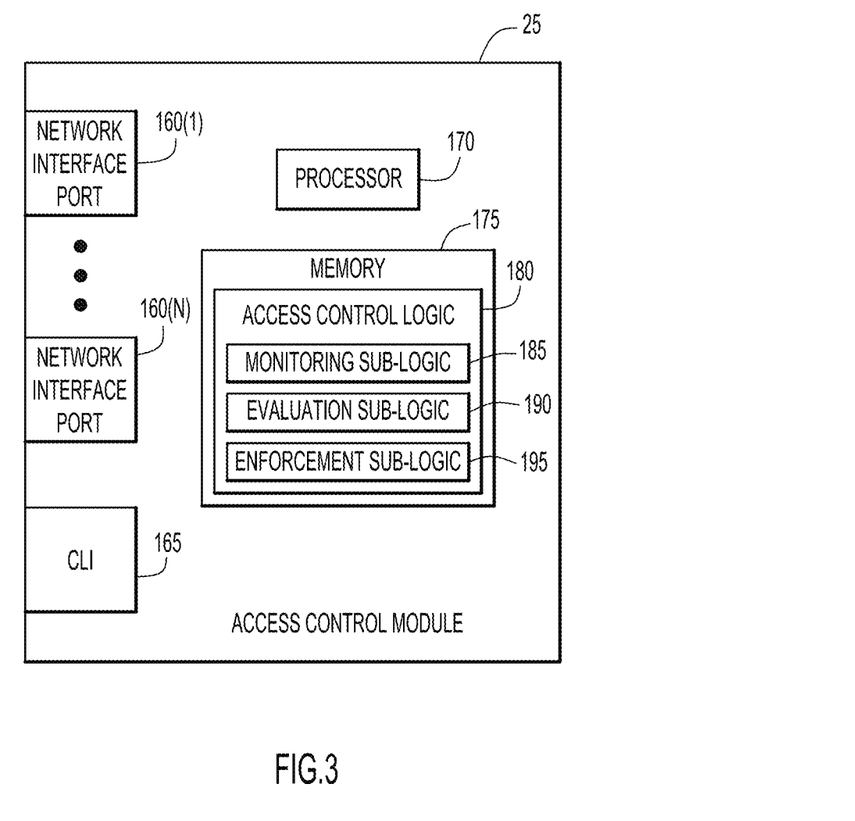
FIG. 3 is a block diagram of an access control module in accordance with examples presented herein.

FIG. 3 is a block diagram of an access control module 25 in accordance with examples presented herein. As noted, the access control module 25 is an identity-based platform that gathers real time information from the network, user, devices type and network attachment location to make access and authorization decision entitled by different session. Also as noted, the access control module 25 tracks all the sessions of all users and endpoints in the network deployment infrastructure controlled by the access control module.

As shown, access control module 25 comprises a plurality of network interface ports 160(1)-160(N), a command-line interface (CLI) 165, a processor 170, and a memory 175 that includes access control logic 180. The access control logic 180 comprises monitoring sub-logic 185, evaluation sub-logic 190, and enforcement sub-logic 195.

The network interface ports 160(1)-160(N) provide connections between the access control module 25 and one or more of the network devices 15(1)-15(N) for sending/receiving traffic. Network interface ports 160(1)-160(N) may be, for example, Ethernet ports implemented in one or more application-specific integrated circuits (ASICs). The CLI 165 is a mechanism by which commands can be delivered to the access control module 25 in the form of successive lines of text (command lines). As such, the CLI 165 may be used by the network administrator to establish/configure network policies as described above for enforcement on network endpoints. It should be appreciated that use of the CLI 165 is merely an example and that other mechanisms may also or alternatively be provided for a network administrator to use in configuring network policies on the access control module 25.

Memory 175 may comprise read only memory (ROM), random access memory (RAM), magnetic disk storage media devices, optical storage media devices, flash memory devices, electrical, optical, or other physical/tangible memory storage devices. The processor 170 is, for example, a microprocessor or microcontroller that executes instructions for the access control logic 180. Thus, in general, the memory 175 may comprise one or more tangible (non-transitory) computer readable storage media (e.g., a memory device) encoded with software comprising computer executable instructions and when the software is executed (by the processor 170) it is operable to perform the access control operations described herein. That is, in accordance with examples presented herein, monitoring sub-logic 185 may be executed to deploy agents 80 on network endpoints and to monitor the agents 80 to receive contextual information about active network sessions. The evaluation sub-logic 190 may be executed to evaluate contextual information in view of any network policies and to determine a policy action for enforcement on a network endpoint. Finally, enforcement sub-logic 195 may be executed to transmit a notification to the software/hardware on the network endpoint (e.g., an access control agent 80) of the policy action to be enforced.

Figure 4:
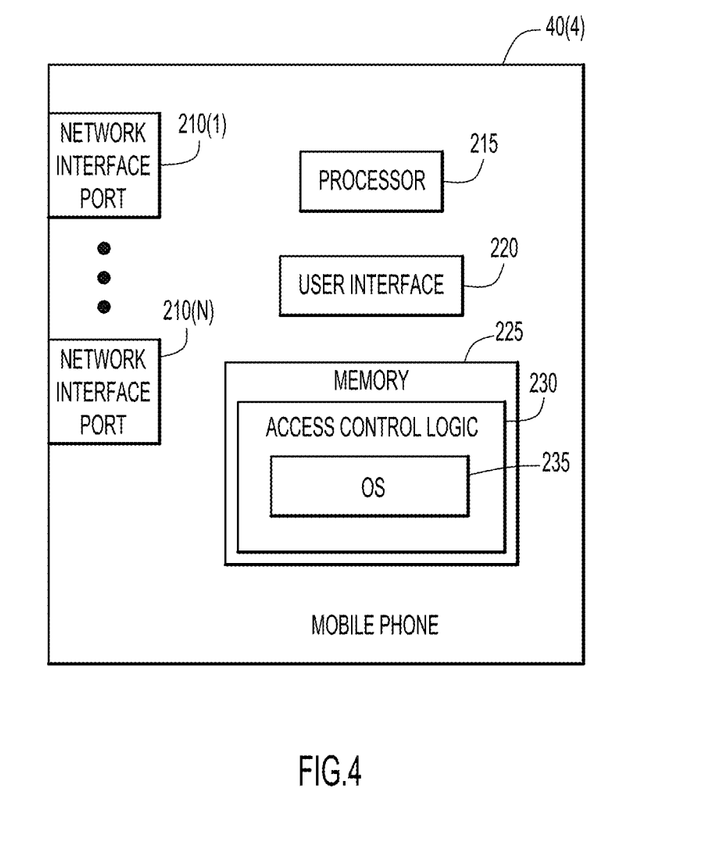
FIG. 4 is a block diagram of a network endpoint in accordance with examples presented herein.

FIG. 4 is a block diagram illustrating further details of an example network endpoint that may be a computer (desktop, laptop, etc.,) or a mobile device (phone, tablet, etc.) that establishes a network session with an enterprise computing network. For ease of illustration, the examples of FIG. 4 will be described with reference to one type of network endpoint, namely mobile phone 40(4) of FIG. 1. As shown, mobile phone 40(4) comprises a plurality of network interfaces 210(1)-210(N). These network interfaces 210(1)-210(N) may be, for example, wireless interfaces, such as Wi-Fi interfaces, 3G interfaces, Bluetooth interfaces, etc. Mobile phone 40(4) further comprises a processor 215, a user interface 220, and a memory 225. Memory 225 comprises access control agent logic 230 and an OS 235.

User interface 220 may take many different forms and may include, for example, a keypad, keyboard, mouse, touchscreen, display screen, etc. Memory 225 may comprise ROM, RAM, magnetic disk storage media devices, optical storage media devices, flash memory devices, electrical, optical, or other physical/tangible memory storage devices. The processor 215 is, for example, a microprocessor or microcontroller that executes instructions for the access control agent logic 230 and the OS 235. Thus, in general, the memory 225 may comprise one or more tangible computer readable storage media (e.g., a memory device) encoded with software comprising computer executable instructions and when the software is executed (by the processor 215) it is operable to perform the operations described herein in connection with access control agents 80.

FIGS. 3 and 4 illustrate a software implementation of access control logic 180 and access control agent logic 230. It is to be appreciated that these software implementations of FIGS. 3 and 4 are merely illustrative and that other implementations are possible. For example, in an alternative arrangement, access control logic 180 and access control agent logic 230 may be implemented fully or partially as hardware elements, such as digital logic gates in one or more ASICS.

Figure 5:
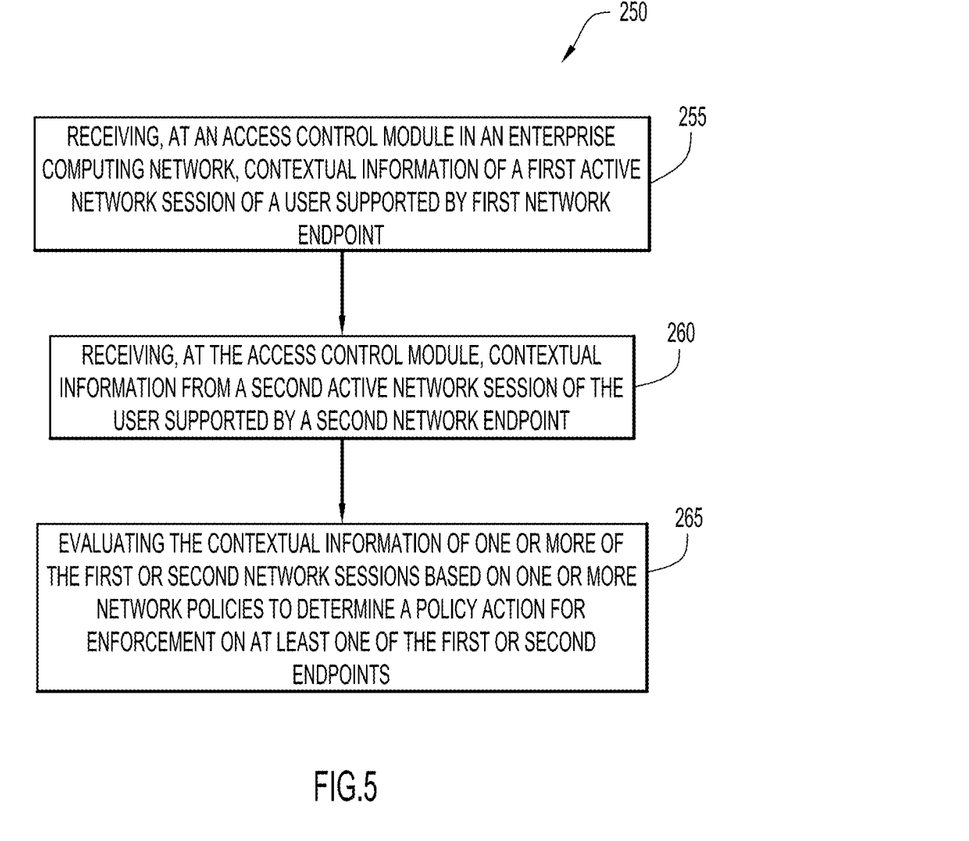
FIG. 5 is a high-level flowchart of an access control method in accordance with examples presented herein.

FIG. 5 is a high-level flowchart of a method 250 in accordance with examples presented herein. Method 250 begins at 255 where an access control module in an enterprise computing network receives contextual information of a first active network session of a user supported by first network endpoint. At 260, the access control module receives contextual information from a second active network session of the user supported by a second network endpoint. At 265, the contextual information of one or more of the first or second network sessions is evaluated by the access control module based on one or more network policies to determine a policy action for enforcement on at least one of the first or second endpoints.

The access control techniques presented herein provide a policy enforcement method where the contextual information of different network sessions is gathered. The contextual information of one network session is used to trigger the re-evaluation of policy decisions and, possibly, change the authorization of another network session. The access control techniques presented herein provide a unified and holistic to management of different network sessions of a user for consistent enforcement of policies across a computing network.

The above description is intended by way of example only.

What is claimed is:

1. A method comprising:
  receiving contextual information of a first active network session of a user supported by a first network endpoint in an enterprise computing network;
  receiving contextual information of a second active network session of the user supported by a second network endpoint in the enterprise computing network; and
  evaluating the collective contextual information of both the first and second active network sessions of the user at the respective first and second network endpoints, based on one or more network policies to determine a policy action for enforcement,
  wherein the contextual information of the first and second active network sessions comprises an indication of the user's interaction with an input device at one or both of the first and second network endpoints, and
  wherein the policy action comprises triggering a block of access to a network resource for the first active network session when the second active network session indicates that the user is moving to a location different from the first active network endpoint and re-authenticating the first active network session to enable access to the network resource for the first active network session when the second active network session indicates that the user has come back to the first network endpoint.

2. The method of claim 1, further comprising:
  monitoring the contextual information of the first active network session via an access control agent on the first network endpoint; and
  monitoring the contextual information of the second active network session via an access control agent on the second network endpoint.

3. The method of claim 1, further comprising:
  transmitting a notification of the policy action to an access control agent on at least one of the first or second network endpoints for enforcement of the policy action by the access control agent on the at least one first or second network endpoint.

4. The method of claim 1, further comprising:
  receiving contextual information of the first active network session indicating the location of the first network endpoint; and
  receiving contextual information of the second active network session indicating the location of the second network endpoint.

5. The method of claim 4, wherein evaluating the contextual information of one or more of the first or second network active sessions comprises:
  determining that the first and second network endpoints are at different locations; and
  determining that an entitlement adjustment should be enforced at the first network endpoint.

6. The method of claim 5, wherein determining that an entitlement adjustment should be enforced at the first network endpoint comprises:
  determining that only access to one or more network resources should be disabled at the first network endpoint.

7. The method of claim 5, wherein determining that an entitlement adjustment should be enforced at the first network endpoint comprises:
  determining that access to the enterprise computing network should be disabled at the first network endpoint.

8. The method of claim 1, further comprising:
  receiving contextual information of the first active network session indicating use of one or more applications on the first network endpoint; and
  receiving contextual information of the second active network session indicating use of one or more applications on the second network endpoint.

9. The method of claim 8, wherein evaluating the contextual information of one or more of the first or second network active sessions comprises:
  determining that network resources are only being used on the second network endpoint; and
  determining that an entitlement adjustment should be enforced at the first network endpoint.

10. The method of claim 9, wherein determining that an entitlement adjustment should be enforced at the first network endpoint comprises:
  determining that only access to one or more network resources should be disabled at the first network endpoint.

11. The method of claim 9, wherein determining that an entitlement adjustment should be enforced at the first network endpoint comprises:
  determining that access to the enterprise computing network should be disabled at the first network endpoint.

12. An apparatus comprising:
  a plurality of network interface ports configured for communication with one or more network devices of an enterprise computing network;
  a memory comprising access control logic; and
  a processor configured to:
    receive, via one of the network interface ports, contextual information of a first active network session of a user supported by a first network endpoint via one of the network interface ports;
    receive, via one of the network interface ports, contextual information of a second active network session of the user supported by a second network endpoint; and
    evaluate the collective contextual information of both the first and second active network sessions of the user at the respective first and second network endpoints, based on one or more network policies to determine a policy action for enforcement, wherein the contextual information of the first and second active network sessions comprises an indication of the user's interaction with an input device at one or both of the first and second network endpoints, and wherein the policy action cause the processor to trigger a block of access to a network resource for the first active network session when the second active network session indicates that the user is moving to a location different from the first active network endpoint and re-authenticating the first active network session to enable access to the network resource for the first active network session when the second active network session indicates that the user has come back to the first network endpoint.

13. The apparatus of claim 12, wherein the processor is configured to:
monitor the contextual information of the first active network session via an access control agent on the first network endpoint; and
monitor the contextual information of the second active network session via an access control agent on the second network endpoint.

14. The apparatus of claim 12, wherein the processor is further configured to:
transmit, via one of the network interface ports, a notification of the policy action to an access control agent on the at least one of the first or second network endpoints for enforcement of the policy action by the access control agent.

15. The apparatus of claim 12, wherein the processor is configured to:
receive contextual information of the first active network session indicating the location of the first network endpoint; and
receive contextual information of the second active network session indicating the location of the second network endpoint.

16. The apparatus of claim 15, wherein to evaluate the contextual information of one or more of the first or second network active sessions the processor is configured to:
determine that the first and second network endpoints are at different locations; and
determine that an entitlement adjustment should be enforced at the first network endpoint.

17. The apparatus of claim 16, wherein to determine that an entitlement adjustment should be enforced at the first network endpoint the processor is configured to:
determine that only access to one or more network resources should be disabled at the first network endpoint.

18. The apparatus of claim 16, wherein to determine that an entitlement adjustment should be enforced at the first network endpoint the processor is configured to:
determine that access to the enterprise computing network should be disabled at the first network endpoint.

19. The apparatus of claim 12, wherein the processor is further configured to:
receive contextual information of the first active network session indicating use of one or more applications on the first network endpoint; and
receive contextual information of the second active network session indicating use of one or more applications on the second network endpoint.

20. The apparatus of claim 19, wherein to evaluate the contextual information of one or more of the first or second active network sessions the processor is configured to:
determine that network resources are only being used on the second network endpoint; and
determine that an entitlement adjustment should be enforced at the first network endpoint.

21. The apparatus of claim 20, wherein to determine that an entitlement adjustment should be enforced at the first network endpoint the processor is configured to:
determine that only access to one or more network resources should be disabled at the first network endpoint.

22. The apparatus of claim 20, wherein to determine that an entitlement adjustment should be enforced at the first network endpoint the processor is configured to:
determine that access to the enterprise computing network should be disabled at the first network endpoint.

23. One or more computer readable non-transitory storage media encoded with software comprising computer executable instructions and when the software is executed operable to:
at an access control module of an enterprise computing network, receive contextual information of a first active network session of a user supported by a first network endpoint;
receive contextual information of a second active network session of the user supported by a second network endpoint; and
evaluate the collective contextual information of both the first and second active network sessions of the user at the respective first and second network endpoints, based on one or more network policies to determine a policy action for enforcement on at least one of the first or second network endpoints,
wherein the contextual information of the first and second active network sessions comprises an indication of the user's interaction with an input device at one or both of the first and second network endpoints, and
wherein the policy action comprises triggering a block of access to a network resource for the first active network session when the second active network session indicates that the user is moving to a location different from the first active network endpoint and re-authenticating the first active network session to enable access to the network resource for the first active network session when the second active network session indicates that the user has come back to the first network endpoint.

24. The computer readable non-transitory storage media of claim 23, further comprising instructions that when executed are operable to:
monitor the contextual information of the first active network session via an access control agent on the first network endpoint that is configured to transmit the contextual information of the first network endpoint to the access control module; and
monitor the contextual information of the second active network session via an access control agent on the second network endpoint that is configured to transmit the contextual information of the second network endpoint to the access control module.

25. The computer readable non-transitory storage media of claim 23, further comprising instructions that when executed are operable to:
transmit, via one of the network interface ports, a notification of the policy action to an access control agent on the at least one of the first or second network endpoints for enforcement of the policy action by the access control agent.

26. The computer readable non-transitory storage media of claim 23, further comprising instructions that when executed operable to:
- receive contextual information of the first active network session indicating the location of the first network endpoint; and
- receive contextual information of the second active network session indicating the location of the second network endpoint.

27. The computer readable non-transitory storage media of claim 26, wherein instructions operable to evaluate the contextual information of one or more of the first or second active network sessions comprises instructions operable to:
- determine that the first and second network endpoints are at different locations; and
- determine that an entitlement adjustment should be enforced at the first network endpoint.

28. The computer readable non-transitory storage media of claim 27, wherein the instructions operable to determine that an entitlement adjustment should be enforced at the first network endpoint comprise instructions operable to:
- determine that only access to one or more network resources should be disabled at the first network endpoint.

* * * * *